(12) United States Patent
Tunar et al.

(10) Patent No.: US 7,801,931 B2
(45) Date of Patent: Sep. 21, 2010

(54) SYSTEM AND METHOD FOR COMMON STORAGE OBJECT MODEL

(75) Inventors: Emre Tunar, Coram, NY (US); Alioune Thiam, Hugo, MN (US); Keywan H. Esfahani, Saint-Laurent (CA)

(73) Assignee: Computer Associates Think, Inc., Islandia, NY (US)

( * ) Notice: Subject to any disclaimer, the term of this patent is extended or adjusted under 35 U.S.C. 154(b) by 697 days.

(21) Appl. No.: 11/093,063

(22) Filed: Mar. 28, 2005

(65) Prior Publication Data

US 2006/0074975 A1    Apr. 6, 2006

Related U.S. Application Data

(63) Continuation of application No. 10/889,715, filed on Jul. 12, 2004, now abandoned.

(60) Provisional application No. 60/486,509, filed on Jul. 11, 2003.

(51) Int. Cl.
G06F 12/00 (2006.01)
G06F 17/30 (2006.01)

(52) U.S. Cl. .................. 707/827; 707/955; 707/959

(58) Field of Classification Search .................. 707/103
See application file for complete search history.

(56) References Cited

U.S. PATENT DOCUMENTS

| | | | | |
|---|---|---|---|---|
| 3,988,721 A | * | 10/1976 | Frutiger | 365/63 |
| 4,993,030 A | * | 2/1991 | Krakauer et al. | 714/6 |
| 5,018,060 A | * | 5/1991 | Gelb et al. | 707/205 |
| 5,119,475 A | * | 6/1992 | Smith et al. | 715/866 |
| 5,265,206 A | * | 11/1993 | Shackelford et al. | 719/316 |
| 5,493,680 A | * | 2/1996 | Danforth | 717/108 |
| 5,515,524 A | * | 5/1996 | Lynch et al. | 703/13 |
| 5,787,437 A | * | 7/1998 | Potterveld et al. | 707/103 R |
| 5,809,507 A | * | 9/1998 | Cavanaugh, III | 1/1 |
| 5,822,569 A | * | 10/1998 | McPartlan et al. | 703/21 |
| 5,890,158 A | * | 3/1999 | House et al. | 707/10 |
| 5,915,253 A | * | 6/1999 | Christiansen | 707/103 R |
| 6,006,279 A | * | 12/1999 | Hayes | 719/328 |
| 6,016,495 A | * | 1/2000 | McKeehan et al. | 707/103 R |
| 6,167,404 A | * | 12/2000 | Morcos et al. | 707/102 |

(Continued)

FOREIGN PATENT DOCUMENTS

WO    WO2004/086198    * 10/2004

OTHER PUBLICATIONS

Similarity Measures for Object-Oriented case representations, University of Kaiserslautern, Germany, Bergmann et al.*

(Continued)

*Primary Examiner*—Pierre M Vital
*Assistant Examiner*—Augustine Obisesan
(74) *Attorney, Agent, or Firm*—Baker Botts L.L.P.

(57) ABSTRACT

A system and method for common storage object model is provided. In one aspect, one or more classes representing respective one or more storage devices are provided. One or more plugin modules are operable to discover and provision one or more storage devices connected to a storage network using the one or more classes. A wrapper module is operable to handle selecting and loading of the one or more plugin modules.

30 Claims, 7 Drawing Sheets

U.S. PATENT DOCUMENTS

| | | | | |
|---|---|---|---|---|
| 6,182,116 | B1* | 1/2001 | Namma et al. | 709/204 |
| 6,216,152 | B1* | 4/2001 | Wong et al. | 709/203 |
| 6,237,006 | B1* | 5/2001 | Weinberg et al. | 707/103 R |
| 6,259,679 | B1* | 7/2001 | Henderson et al. | 370/254 |
| 6,269,475 | B1* | 7/2001 | Farrell et al. | 717/113 |
| 6,301,582 | B1* | 10/2001 | Johnson et al. | 707/103 R |
| 6,305,009 | B1* | 10/2001 | Goor | 717/116 |
| 6,343,265 | B1* | 1/2002 | Glebov et al. | 703/25 |
| 6,349,404 | B1* | 2/2002 | Moore et al. | 717/104 |
| 6,654,765 | B2* | 11/2003 | Wong et al. | 707/103 R |
| 6,789,252 | B1* | 9/2004 | Burke et al. | 717/100 |
| 6,948,153 | B2* | 9/2005 | Bowers | 717/124 |
| 7,003,527 | B1* | 2/2006 | Lavallee et al. | 707/102 |
| 7,194,477 | B1* | 3/2007 | Bradley et al. | 707/102 |
| 2002/0143814 | A1* | 10/2002 | Hepworth et al. | 707/512 |
| 2002/0184226 | A1* | 12/2002 | Klicnik et al. | 707/100 |
| 2002/0199031 | A1* | 12/2002 | Rust et al. | 709/315 |
| 2003/0004952 | A1* | 1/2003 | Nixon et al. | 707/10 |
| 2003/0112232 | A1* | 6/2003 | Georgalas | 345/418 |
| 2003/0138765 | A1* | 7/2003 | Bowers | 434/322 |
| 2003/0145041 | A1* | 7/2003 | Dunham et al. | 709/203 |
| 2003/0182602 | A1* | 9/2003 | Bowers | 714/100 |
| 2004/0093587 | A1* | 5/2004 | Sesma | 717/118 |
| 2004/0103114 | A1* | 5/2004 | Sesma | 707/103 R |
| 2004/0199489 | A1* | 10/2004 | Barnes-Leon et al. | 707/1 |
| 2004/0225668 | A1* | 11/2004 | Teegan et al. | 707/100 |
| 2005/0005261 | A1* | 1/2005 | Severin | 717/108 |
| 2005/0039190 | A1* | 2/2005 | Rees et al. | 719/316 |
| 2006/0047665 | A1* | 3/2006 | Neil | 707/10 |
| 2006/0235811 | A1* | 10/2006 | Fairweather | 706/12 |
| 2007/0073769 | A1* | 3/2007 | Baikov et al. | 707/104.1 |
| 2007/0112714 | A1* | 5/2007 | Fairweather | 706/46 |

OTHER PUBLICATIONS

Object-Based Storage, IEEE Communication Magazine, Aug. 2003, Mesnier et al.*

Multimedia Information Management in an Object-Oriented database system, Microelectronics and computer technonlogy corporation, Austin Texas, Woelk et al.*

Woithe et al., "Bluefin; A Common Interface for SAN Management," Storage Networking Industry Association, XP-002488396, pp. 1-5 plus title page, Aug. 13, 2002.

Communication from the EPO; Application No. 04778241.2-1243 / 1652043 PCT/US2004022636, 2 pages, Jul. 28, 2008.

Communication pursuant to 94(3) EPC; Application No. 04 778 241.2-1243; Reference HCD/J00048475EP, 3 pages, Feb. 8, 2010.

* cited by examiner

**\*enumerations**
DiskState

- Offline (Clariion)
- Unallocated (Hitachi)
- spare (Hitachi)
- online (Hitachi)
- unknown (Hitachi)
- outofservice (Hitachi)
- spareuninitialized (Hitachi)
- ready (Symmetrix)
- notready (Symmetrix)
- writedisabled (Symmetrix)
- NA (Symmetrix)
- Bound (Clariion)
- BoundUnassigned (Clariion)
- Unbound (Clariion)
- Rebuilding (Clariion)
- Enabled (Clariion)
- Binding (Clariion)
- Formatting (Clariion)
- HotSpareReady (Clariion)
- WqualizingwithaHotSpare (Clariion)
- Unsupported (Clariion)
- Unformatted (Clariion)
- Data
- Mixed (Symmetrix)

**\*enumerations**
RAIDType

- MIRR_2 (Symmetrix)
- MIRR_3 (Symmetrix)
- MIRR_4 (Symmetrix)
- RAID_S (Symmetrix)
- RAID_S_MIRR (Symmetrix)
- RDF_R1 (Symmetrix)
- RDF_R2 (Symmetrix)
- RDF_R1_RAID_S (Symmetrix)
- RDF_R2_RAID_S (Symmetrix)
- RDF_R1_MIRR (Symmetrix)
- RDF_R2_MIRR (Symmetrix)
- SCV (Symmetrix)
- SCV_MIRR_2 (Symmetrix)
- SCV_RDF_R1 (Symmetrix)
- SCV_RDF_R1_MIRR (Symmetrix)
- DRV (Symmetrix)
- DRV_MIRR_2 (Symmetrix)
- SCV_RDF_R2 (Symmetrix)
- SCV_RDF_R2_MIRR (Symmetrix)
- RAIDx(yD+zP)) (Hitachi x = RAID level, y = #of data disks, z = #of parity disks)
- RAID0 (Clariion, Compaq, use for Hitachi)
- RAID1 (Clariion, Compaq, use for Hitachi)
- RAID3 (Clariion, Compaq, use for Hitachi)
- RAID5 (Clariion, Compaq, use for Hitachi)

**\*enumerations**
StorageControllerState

- normal (Clariion, Hitachi)
- missing (Clariion)
- degraded (Clariion)
- bypassed (Clariion)
- failed (Clariion)
- acute (Hitachi)
- serious (Hitachi)
- moderate (Hitachi)
- service? (Hitachi)

**\*enumerations**
DevStatus

- State = Symmetrix
- Sync = Symmetrix
- DegradedRaid5 = Symmetrix
- UnusableRaid5 = Symmetrix
- Empty = Symmetrix
- SyncinProgress = Symmetrix
- NeedSync = Symmetrix
- NoDevice = Symmetrix
- Degraded = Symmetrix
- Initializing = Symmetrix

**\*enumerations**
DevType

- standard (Hitachi)
- HIHSMReserved (Hitachi)
- onDemand (Hitachi)
- BCV (Symmetrix)
- Gatekeeper (Symmetrix)
- DynamicVolume (Symmetrix)
- BCV_RDF (Symmetrix)

**\*enumerations**
ExtentCondition

- State = Symmetrix
- Sync = Symmetrix
- ReSync = Symmetrix
- Initializing = Symmetrix
- Offline = Symmetrix

**\*enumerations**
PowerSupplyState

- acute (Hitachi)
- serious (Hitachi)
- moderate (Hitachi)
- service? (Hitachi)

**\*enumerations**
FanState

- acute (Hitachi)
- serious (Hitachi)
- moderate (Hitachi)
- service? (Hitachi)

**\*enumerations**
LUNState

- Bound (Clariion)
- Binding (Clariion)
- DoesNotExist (Clariion)

SYSTEM AND METHOD FOR COMMON STORAGE OBJECT MODEL

CROSS-REFERENCE TO RELATED APPLICATIONS

This application is a Continuation of U.S. Ser. No. 10/889,715 filed on Jul. 12, 2004 now abandoned and claims the benefit of U.S. Provisional Application No. 60/486,509 entitled COMMON STORAGE OBJECT MODEL filed on Jul. 11, 2003, the entire disclosure of which is incorporated herein by reference.

TECHNICAL FIELD

This application relates to an object model that describes enterprise storage environment.

BACKGROUND

A frequently occurring task for many providers of computer services is adding support of a new device into an existing application. Most of the time, such a task requires a massive development effort, and even redesigning and/or rebuilding the whole application. Accordingly, a common storage object model is provided.

SUMMARY

A system and method for common storage object model is provided. The system in one aspect includes one or more classes representing respective one or more storage devices. One or more plugin modules are operable to discover and provision one or more storage devices connected to a storage network using the one or more classes. A wrapper module is operable to handle selecting and loading of the one or more plugin modules.

The method in one aspect includes providing one or more classes to represent respective one or more storage devices, providing one or more plugin modules operable to discover and provision one or more storage devices connected to a storage network using the one or more classes, and providing a wrapper module operable to handle selecting and loading of the one or more plugin modules.

Further features as well as the structure and operation of various embodiments are described in detail below with reference to the accompanying drawings. In the drawings, like reference numbers indicate identical or functionally similar elements.

DETAILED DESCRIPTION

CA Common Storage Object Model is an object model that describes both the physical and the logical elements of an enterprise storage environment, and relationships among these elements in a hierarchical and/or relational object model.

In one embodiment, each element is represented as a class which has attributes and methods. The objects and properties in the model are gathered by looking at different vendor APIs and storage device platforms. Thus the model provides a unique vendor independent data representation, which permits to query and handle data from different set of devices. The data is represented in a single format making it easy to support more devices and integrate components within company's storage applications.

The design also supports multiple views of the same resources without duplication by associating different classes or entities. For example a volume on a host can be correlated to the device volumes it is constructed of.

With the class hierarchy and the extra property attributes of each class, new features or device specific features can be added without altering the application which is using the model. Objects and methods can be easily added as needed by the changing storage environment.

Common storage object model, in one embodiment, comprises a collection of classes of storage entities. Each storage entity (physical & logical) is represented as a class with attributes and methods. Relationships among the entities are represented as attributes, and/or references. The common storage object model of the present disclosure may be provided as a C++ dll (data link library module), which exports these classes, which may be used by plugins and consumers.

For each supported storage device, plugins may be written, which may use a mechanism available for that device (Vendor Specific API's, Industry Standards such as CIM/SMIS/Bluefin, etc.) to discover and populate the object model for that device. Consumer applications may use the CSM and the plugins to retrieve and consume the storage data extracted from the devices.

In one embodiment, plugin functionality is handled by a wrapper library which handles dynamic loading of the libraries, therefore no code changes are needed to add a new library/device support. Consumer application may use the wrapper to load the appropriate plugins, have the object model populated by the plugins, and then use the data retrieved according to their needs.

Figure 2A:
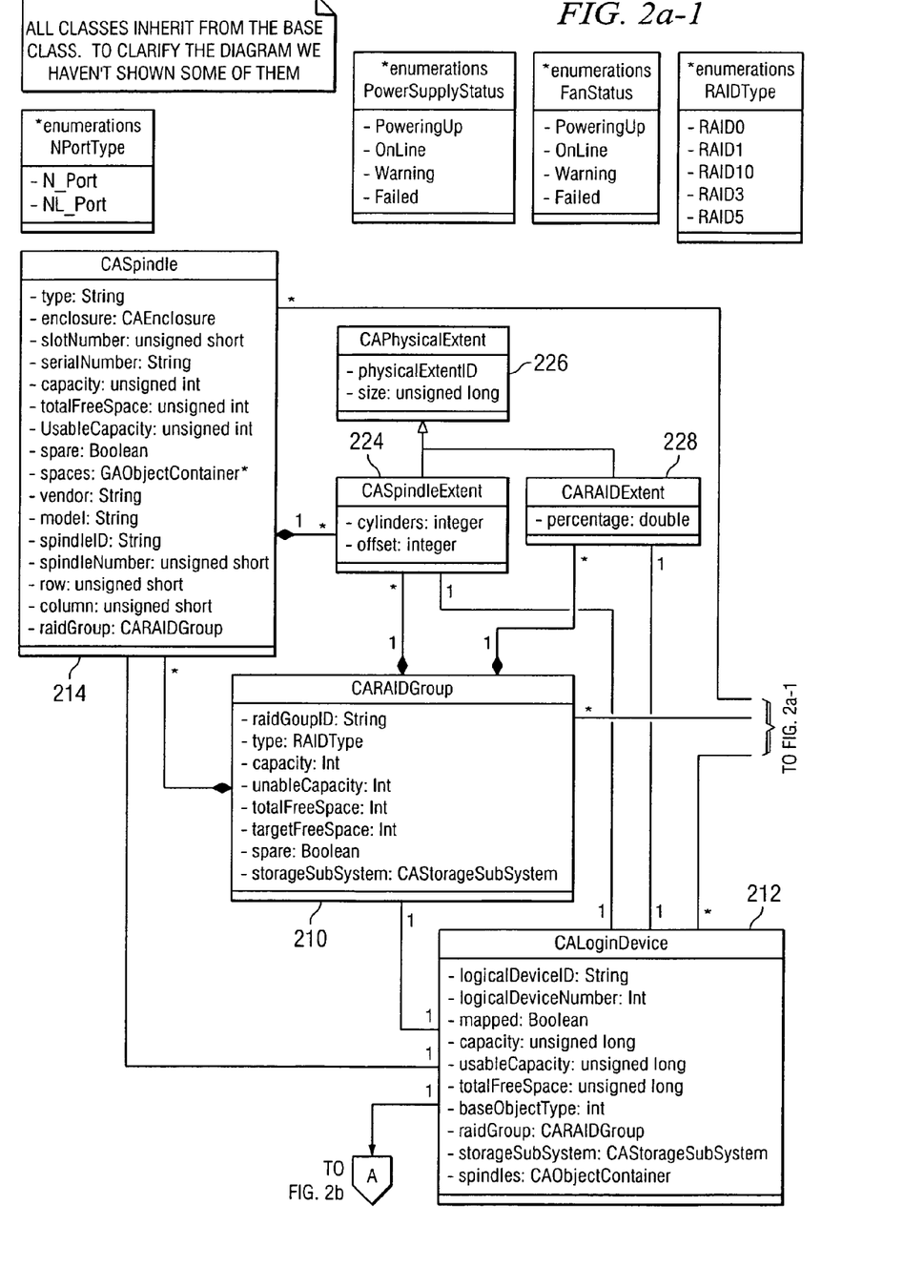
FIG. 2*a* and FIG. 2*b* illustrate the set of classes that model the physical and logical elements of enterprise storage environment and the relationships among these elements.
Figure 2A:
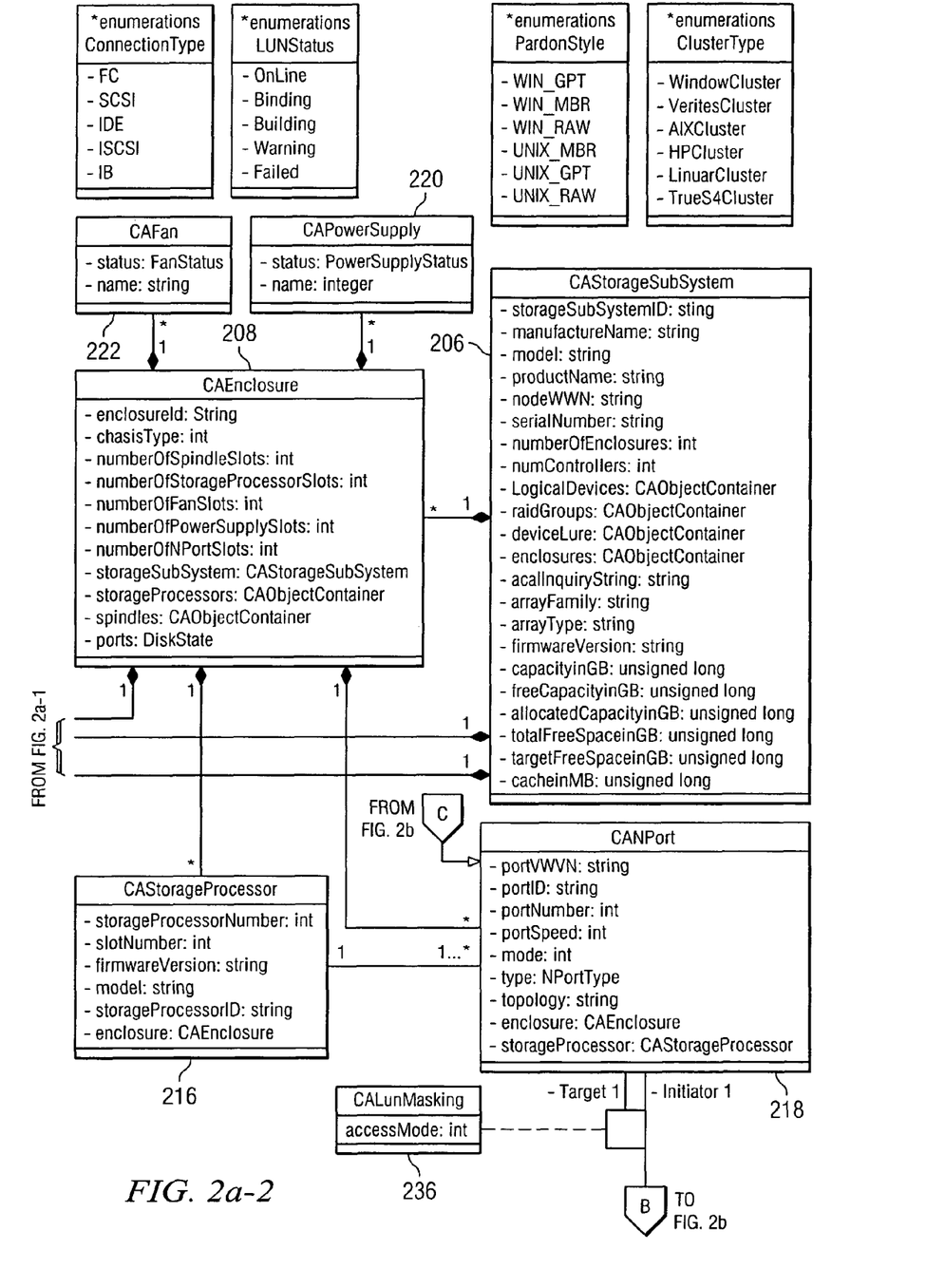
Figure 2B:
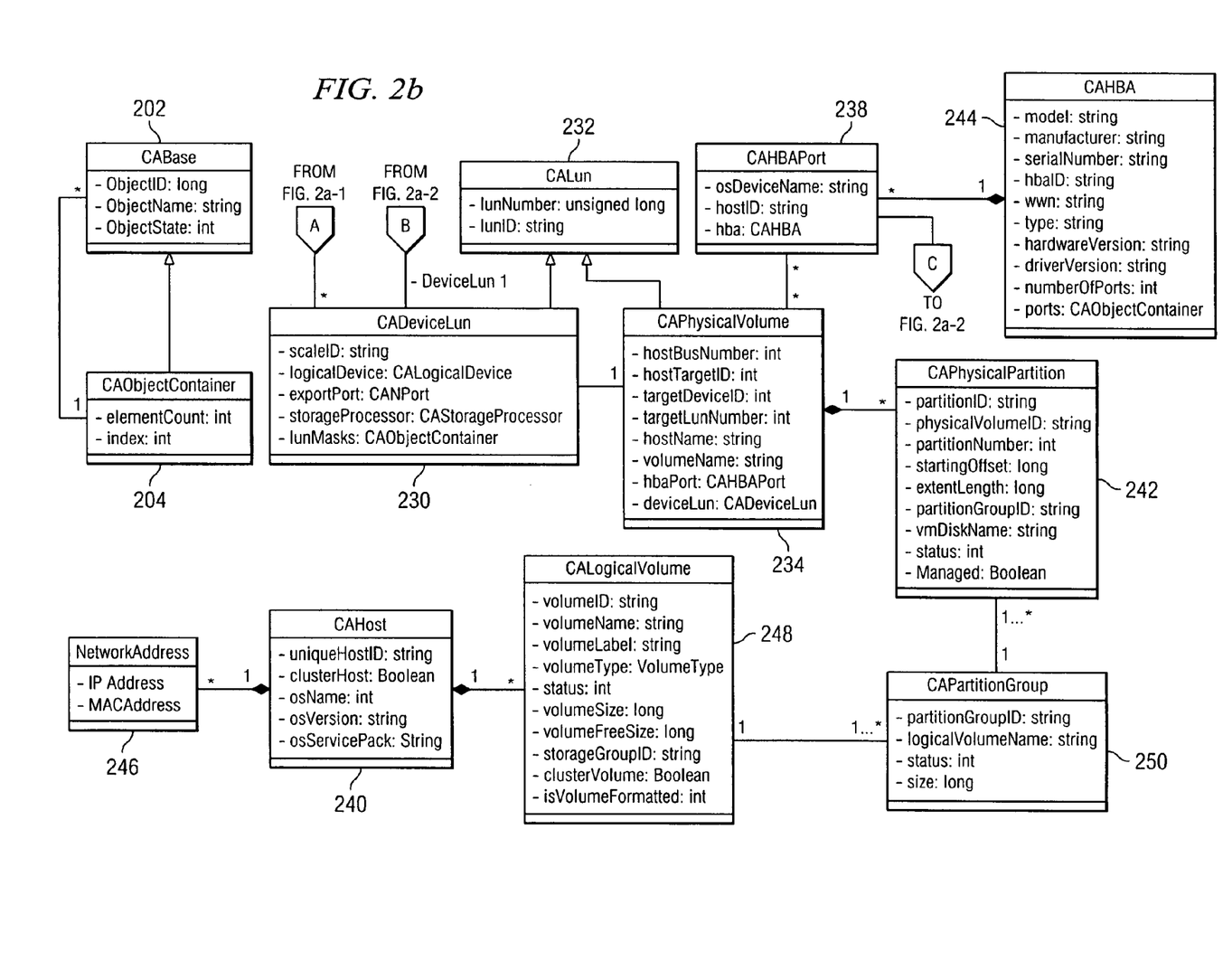

The common storage object model (CSM) comprises a set of classes that model the physical and logical elements of enterprise storage environment and the relationships among these elements. FIG. 2*a* and FIG. 2*b* illustrate the set of classes. In one embodiment, all classes have a common ancestor and each instance of a class has a unique identity. To capture vendor specific properties and behavior, it is possible to extend the CSM classes through inheritance. Each class that will be added to CSM in future will be able to work with existing applications because of polymorphic behavior of the classes.

In one embodiment, the common ancestor class provides three methods for all the objects: "Clone", "Equal", and "GetExtraProperty". Clone creates an instance of the object and Equal compares the object to another instance to see if they are equal. These two methods can be overwritten in the child classes to function more precisely for instances of each child class. GetExtraProperty makes it possible for consumer applications to handle device specific properties in the plugins without any code changes in the application. This method returns the property name, its type and the corresponding value.

Class CABase 202 is the common parent of every other class in the object model. CABase 202 provides a unique object ID, an object name and an object state for each instance of the child classes. CABase 202 also provides two methods: "Clone" and "Equal". These two methods can be redefined in each child class to function more precisely for instances of that child class.

Class CAObjectContainer 204 is a list template. This list is designed to contain instances of CABase or any child of CABase. CAObjectContainer 204 itself is a subclass of CABase 202 and this makes it possible to have list of lists.

Class CAStorageSubSystem 206 models a storage disk array. This class contains the basic information about a disk array. CAStorageSubSystem 206 provides methods to handle the physical and logical components of a disk array. CAStorageSubSystem 206 contains one or more instances of CAEnclosure 208, one or more instances of CARaidGroup 210, and one or more instances of CALogicalDevices 212. CAStorageSubSystem 206 is a subclass of CABase 202.

Class CAEnclosure 208 represents an enclosure inside of a storage subsystem. An enclosure is a gathering of storage processors, spindles, ports, fans, and power supplies. CAEnclosure 208 has one or more instances of CASpindle 214, one or more instances of CAStorageProcessor 216, one or more instances of CANPort 218, one or more instances of CAPowerSupply 220, and one or more instances of CAFan 222. Each instance of CAEnclosure 208 is in association with one instance of CAStorageSubSystem 206. Class CAEnclosure 208 is a subclass of CABase 202.

Class CAFan 222 represents a fan in an enclosure. Each instance of CAFan 222 is in association with one instance of CAEnclosure 208. CAFan 222 is a subclass of CABase 202.

Class CAPowerSupply 220 represents a power supply in an enclosure. Each instance of CAPowerSupply 220 is in association with one instance of CAEnclosure 208. CAPowerSupply 220 is a subclass of CABase 202.

Class CASpindle 214 represents a physical disk (spindle) in an enclosure. Each instance of CASpindle 214 is in association with one instance of CAEnclosure 208, can be in association with one instance of CARaidGroup 210, and can be in association with one instance of CALogicalDevice 212. Each instance of CASpindle 214 can have one or more instances of CASpindleExtent 224. CASpindle 214 is a subclass of CABase 202.

Class CAPhysicalExtent 226 is an abstract class. It represents a chunk of a bigger entity. This class is a super class for CASpindleExtent 224 and CARaidExtent 228. CAPhysicalExtent 226 is a subclass of CABase 202.

Class CASpindleExtent 224 represents a part of CASpindle 214. An instance of CASpindleExtent 224 is in association with one instance of CASpindle 214. An instance of CASpindleExtent 224 can be in association with one instance of CALogicalDevice 212. CASpindleExtent 224 existence depends on CASpindle 214. CASpindleExtent 224 is a subclass of CAPhysicalExtent 226.

Class CARaidGroup 210 represents a raid group. An instance of CARaidGroup 210 has one or more instances of CASpindle 214 or one or more instances of CASpindleExtent 224. Each instance of CARaidGroup 210 is in association with one instance of CAStorageSubSystem 206. An instance of CARaidGroup 210 can have one or more instances of CARaidExtent 228. An instance of CARaidGroup 210 can be in association with one or more instances of CALogicalDevice 212.

Class CARaidExtent 228 represents a part of CARaidGroup 210. An instance of CARaidExtent 228 is in association with one instance of CARaidGroup 210. An instance of CARaidExtent 228 can be in association with one instance of CALogicalDevice 212. CARaidExtent 228 existence depends on CARaidGroup 210. CARaidExtent 228 is a subclass of CAPhysicalExtent 226.

Class CALogicalDevice 212 models a logical device that is created out of a raid group or using a spindle, a part of a spindle, or a part of a raid group. CALogicalDevice 212 represents the logical device inside the disk array. An instance of CALogicalDevice 212 can be in association with one and only one instance of CASpindleExtent 224, CARaidExtent 228, CASpindle 214, or CARaidGroup 210. Each instance of CALogicalDevice 212 is in association with an instance of CAStorageSubSystem 206. An instance of CALogicalDevice 212 can be in association with one or many instances of CADeviceLun 230. CALogicalDevice 212 is a subclass of CABase 202.

Class CALun 232 is an abstract class. It represents a LUN. Class CALun 232 is used as a super class for CADeviceLun 230 and CAPhysicalVolume 234. CALun 232 is a subclass of CABase 202.

Class CADeviceLun 230 represents a LUN on a disk array that is exported and ready to be used by a host. Each instance of CADeviceLun 230 is associated with one instance of CALogicalDevice 212. Each instance of CADeviceLun 230 is associated with one instance of CANPort 218. An instance of CADeviceLun 230 can participate in an association with one instance of CALunMask 236 and two instances of CANPort 218 (one as "Target" and one as "Initiator"). An instance of CADeviceLun 230 can be associated with one instance of CAPhysicalVolume 234. CADeviceLun 230 is a subclass of CALun 232.

Class CAPhysicalVolume 234 represents a LUN that is in use by a host and acts as a physical volume on the host. An instance of CAPhysicalVolume 234 is in association with one instance of CADeviceLun 230. Instances of CAPhysicalVolume 234 can be associated with one or more instances of CAHBAPort 238. An instance of CAPhysicalVolume 234 is in association with one instance of CAHost 240. An instance of CAPhysicalVolume 234 can have one or more instances of CAPhysicalPartition 242. CAPhysicalVolume 234 is a subclass of CALun 232.

Class CAStorageProcessor 216 represents a storage processor in an enclosure. An instance of CAStorageProcessor 216 can have one instance of CANPort 218. Each instance of CAStorageProcessor 216 is associated with one instance of CAEnclosure 208. CAStorageProcessor 216 is a subclass of CABase 202.

Class CANPort 218 represents a fiber channel port in an enclosure. An instance of CANPort 218 can be associated with one instance of CAStorageProcessor 216. An instance of CANPort 218 can be associated with one or more instances of CADeviceLun 230. Each instance of CANPort 218 can participate as a "Target" or an "Initiator" in an association with instances of CALunMask 236 and CADeviceLun 230. Each instance of CANPort 218 is associated with one instance of CAEnclosure 208. CANPort 218 is the super class of CAHBAPort 238 and subclass of CABase 202.

Class CAHBAPort 238 models a fiber channel port on a host bus adapter. Each instance of CAHBAPort 238 can be associated with one instance of CAHBA 244. Instances of CAHBAPort 238 can be associated with one or more instances of CAPhysicalVolume 234. CAHBAPort 238 is a subclass of CANPort 218.

Class CAHBA 244 represents a host bus adapter in a host. An instance of CAHBA 244 can have one or more instances of CAHBAPort 238. CAHBA 244 is a subclass of CABase 202.

Class CALunMask 236 represents a mask defined for a device LUN. An instance of CALunMask 236 is associated with one instance of CADeviceLun 230 and two instances of CANPort 218 (one as "Target" and one as "Initiator"). The existence of CALunMask 236 depends on this association. CALunMask 236 is a subclass of CABase 202.

Class CAHost 240 represents a host. Each instance of CAHost 240 can have one or more instances of CANetworkAddress 246, one or more instances of CAPhysicalVolume 234, or more instances of CALogicalVolume 248, and one or more instances of CAHba 244. CAHost 240 is a subclass of CABase 202.

Class CANetworkAddress 246 represents a network address. An instance of CALunMask 236 is associated with one instance of CAHost 202. CANetworkAddress 246 is a subclass of CABase 202.

Class CAPhysicalPartition 242 models a part of CAPhysicalVolume 234. Each instance of CAPhysicalPartition 242 is associated with one instance of CAPhysicalVolume 234. An instance of CAPhysicalPartition 242 can be associated with one instance of CAPartitionGroup 250. CAPhysicalPartition 242 is a subclass of CABase 202.

Class CAPartitionGroup 250 represents a group of CAPhysicalPartitions 242. Each instance of CAPartitionGroup 250 is associated with one or more instances of CAPhysicalPartition 242. An instance of CAPartitionGroup 250 can be associated with one instance of CALogicalVolume 248. CAPartitionGroup 250 is a subclass of CABase 202.

CALogicalVolume 248 represents a volume on the host that has been created using partitions of a CAPhysicalVolume 234. Each instance of CALogicalVolume 248 is associated with one instance of CAHost 240. An instance of CALogicalVolume 248 is associated with one or more instances of CAPartitionGroup 250. CAPhysicalPartition 242 is a subclass of CABase 202.

In one embodiment, the interface is based on a data collection algorithm, which is based on object enumeration, using for example, the same semantic as objects are enumerated in Windows™, that is, the paradigm of GetFirst and GetNext kind of methods. In this paradigm, object enumeration is executed while getting the first object and looping until an EOF is not signaled. This paradigm also implies that objects are enumerated inside the context of their super (parent) object. Thus, Enclosures are enumerated inside the StorageSubSystem object and Disks are enumerated inside Enclosures etc.

Thus, for example, CAStorageSubSystem object collects the Enclosures, the Raid groups and the LUNS. CAstorageSubSystem may include the following functions:

```
GetSysInfo(char * Ip, StorageSubSystemInfo *
pSubsystemInfo)
    [in]    the Ip address or name of the
    (Sym\HDS\Clariion...) machine.
    [out]   pointer to a subsystem info struct.
GetFirstEnc(CEnclosure * pEnclosureInfo)
    [out] pointer to the first Enclosure.
GetNextEnc(CEnclosure * pPrevEnclosureInfo,
            CEnclosure * pNextEnclosureInfo)
    [in] The pointer returned from 'GetFirstEnc'.
    [out] A pointer to the next Enclosure.
GetFirstPort(CN_Port * pPort)
    [out] pointer to the first Port.
GetNextPort(CN_Port * pPrevPort, CN_Port * pNextPort)
    [in] The pointer returned from 'GetFirstPort'.
    [out] A pointer to the next Port.
GetFirstLun(CLUN * pLUNinfo)
    [out] pointer to the first LUN.
```

-continued

```
GetNextLun(CLUN * pPrevLUNinfo, CLUN * pNextLUNinfo)
    [in] The pointer returned from 'GetFirstLun'.
    [out] A pointer to the next LUN.
GetFirstRG(CRaidGroup * pPAIDGroup)
    [out] pointer to the first RaidGroup.
GetNextRG(CRaidGroup * pFirstRAIDGroup,
        CRaidGroup * pNextRAIDGroup)
    [in] The pointer returned from 'GetFirstRG'.
    [out] A pointer to the next RaidGroup.
```

The CEnclosure_object is responsible for the collection of fans, power supply and disks that belong to it. The CEnclosure may include the following functions:

```
GetFirstFanInfo(CFan * pFanInfo)
    [out] pointer to the first Fan in this Enclosure.
    GetNextFanInfo(CFan * pPrevFanInfo, CFan *
    pNextFanInfo)
        [in] The pointer returned from
        'GetFirstFanInfo'.
        [out] A pointer to the next Fan in this
    Enclosure.
    GetFirstPowerSupplyInfo(CPowerSupply *
    pPwrSupplyInfo)
        [out] pointer to the first Power Supply in this
        Enclosure.
    GetNextPowerSupplyInfo(CPowerSupply *
    pPrevPwrSupplyInfo,
            CPowerSupply *
            pNextPwrSupplyInfo)
        [in] The pointer returned from
        'GetFirstPowerSupplyInfo'.
        [out] A pointer to the next PowerSupply in this
        Enclosure.
    GetStrgCtrlInfo(CStorageController * pStrgCtrlInfo)
    GetFirstDiskInfo(CDisk * pDiskInfo)
        [out] pointer to the first Disk in this
        Enclosure.
    GetNextDiskInfo(CDisk * pPrevDiskInfo, CDisk *
    pNextDiskInfo)
        [in] The pointer returned from
'GetFirstDiskInfo'.
        [out] A pointer to the next Disk in this Enclosure.
```

The CDisk object may include GetRGInfo (CRaidGroup * pRaidGroup), which returns a pointer to the Raid Group this disk belongs to. If this disk is a spare EOF is returned.

The CLUN object is responsible for the collection of the Extents it includes and HostLUN information, if available. CLUN object may include the following functions:

```
GetRGInfo(CRAIDGroup * pRaidGroupInfo);
GetFirstExtent(CPhysicalExtent * pExtentInfo);
    GetNextExtent(CPhysicalExtent * pPrevExtentInfo,
    CPhysicalExtent * pNextExtentInfo);
    BOOLEAN isMounted( )   //this method returns HRESULT;
    GetHostLunInfo(CHostLUN * pHostLun).
```

The CDiskLUN object may include the functions GetDiskLunInfo( ), GetHostsInfo( ), GetPath( ), to retrieve respective information.

There are more than one way of collecting data using the above methods. For example, in the Extents object, collect physical extents can be collected from the LUN object (First and next Extent in the specific LUN), or from the disk object (First and next Extent in the specific disk). Those methods may be added as needed.

The CFan, Cport, CRaidGroup objects are information objects. They may include additional methods as needed.

The following data collection algorithm are used, in one embodiment, for collecting data from the devices:

```
StoragSubSystem( )        //constructor - creates the
connection to the application .
GetSysInfo( )             // gets the subsystem information.
// Collection of iron information...
For each Enclosure (using: GetFirstEnc( ),GetNextEnc( ))
:
{
    // Enumeration of all the fans in the Enclosure.
    GetFirstFanInfo( )
    GetNextFanInfo( )
    // Enumeration of all the power supplies in the
Enclosure.
    GetFirstPowerSupplyInfo( )
    GetNextPowerSupplyInfo( )
    GetStrgCtrlInfo( )       //since there is one controller
per enclosure
    // Enumeration of all the disks in the
Enclosure.
    GetFirstDiskInfo( )
    GetNextDiskInfo( )
}
// Enumeration of all the ports in the Subsystem.
GetFirstPort( )
GetNextPort( )
// Enumeration of the raid groups in the subsystem
GetFirstRG( )
GetNextRG( )
// Collecting LUN information
For each LUN (using: GetFirstLun( ),GetNextLun( )) :
//this may return the derivative of LUN (DiskLun ).
{
    //back-end information:
    GetRGInfo()
    // Enumeration of all the Extents in the LUN.
    GetFirstExtent( )
    GetNextExtent( )
    //Front-end information
    if (isMounted( ))        //DiskLun
    {
        GetDiskLunInfo( )     //information available
only for mounted luns.
        GetHostsInfo( )
        GetPath()
        GetHostLunInfo( )
    }
}
```

In one embodiment, each method may return HRESULT. If the method succeeded, the returned HRESULT will be NO_ERROR (0). Any other returned HRESULT signals an error. The actual error description may be fetched using the GetError(hRes) method, which returns the context sensitive error description string (char *) of that error.

In one embodiment, the above interface may be implemented under a framework with specific DC sub classes. In another embodiment, the above interface may be implemented with specific DC classes operating under the same interface and object structures.

Figure 3A:
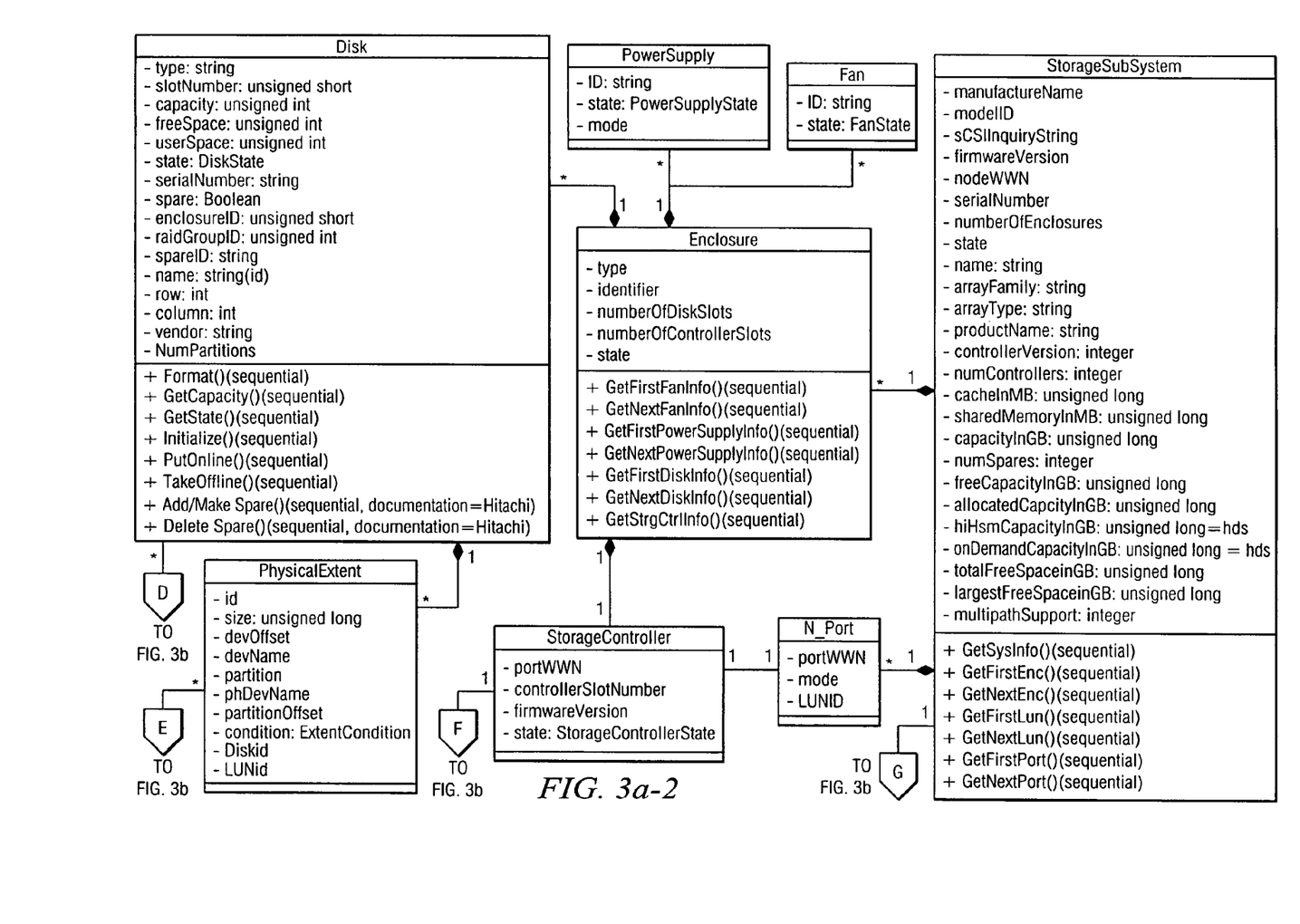
FIG. 3*a* and FIG. 3*b* illustrate the set of classes that model the physical and logical elements of enterprise storage environment and the relationships among these elements as shown in FIG. 2*a* and FIG. 2*b*, in another embodiment.
Figure 3B:
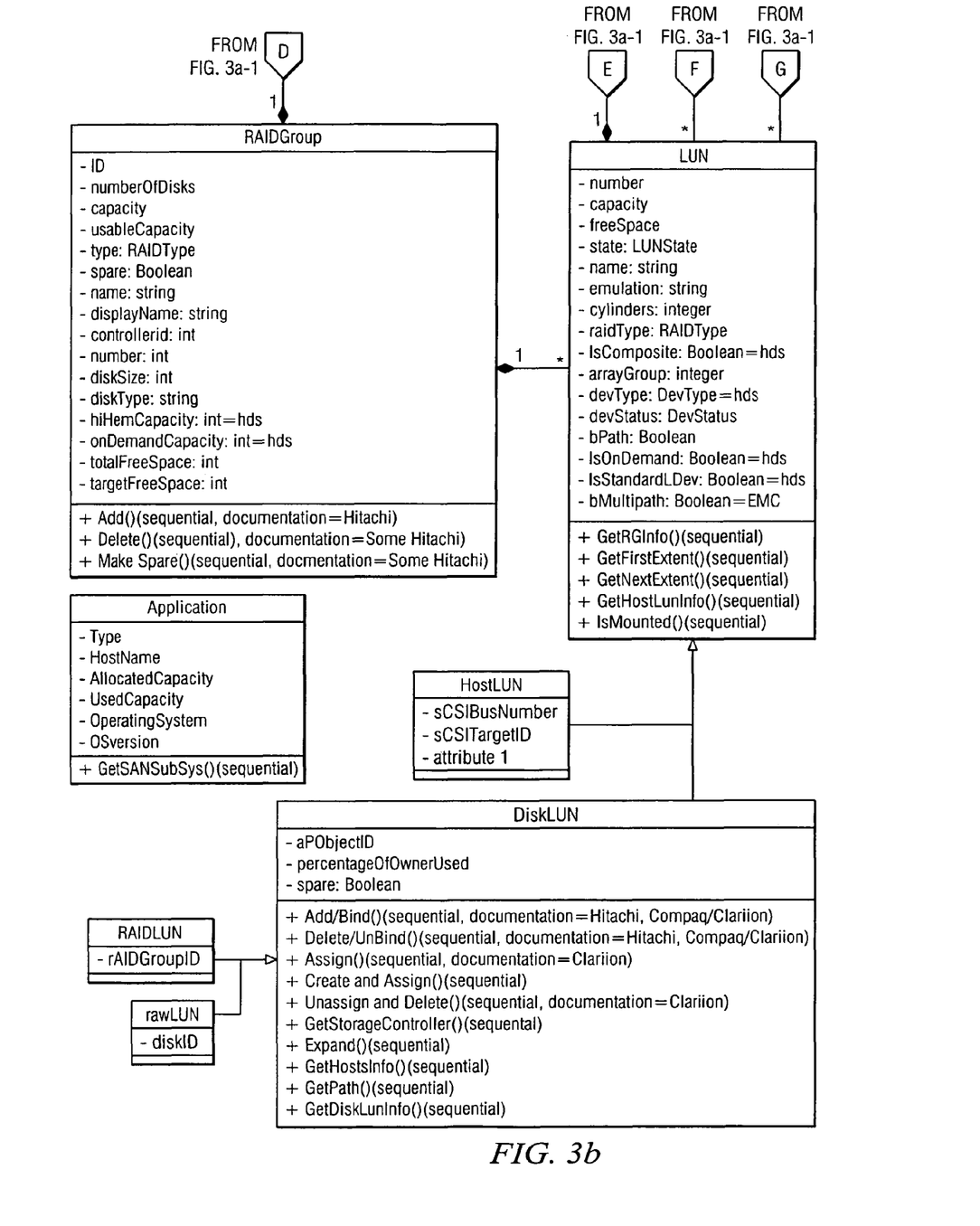

FIG. 3a and FIG. 3b illustrate the set of classes that model the physical and logical elements of enterprise storage environment and the relationships among these elements as shown in FIG. 2a and FIG. 2b, in another embodiment.

Under the Framework setup, the proposed classes do not implement raw data collection, and the methods are defined as pure virtual functions. As such, these classes can be seen as meta classes. Under this framework, the data collection method using the algorithm described above is implemented. The actual raw data collection is implemented in subclasses, each for a specific disk array object. Each object has its own way of getting the information: for instance, SYMAPI, or HICommand, or using CLI and so on.

This way of operation allows easy addition of new devices, by simple implementing the necessary virtual functions (the actual raw data collection, according to the technology of the new device). The data collection itself is entirely generic, capable of collection of partial information also, in case a certain device does not supply all the necessary information. For instance, it is possible that a device does not provide interface about its fans, or it does not contain any enclosure, etc.

For example, class CDisk is a meta class, with pure virtual methods. The class CEMDisk is subclass of Cdisk and it has EMC specific knowledge and implementation of each virtual method. Similarly, the class CHDSDisk has HDS specific knowledge and implementation of each virtual method.

This implementation mechanism does not forbid specific data collection implementation, for example, when only a partial data collection is needed for a specific device.

In the embodiment that uses structure implementation, the proposed classes are structures, defining the attributes each object may have. For each device, there is a separate set of implementation of the same classes, under the same name, in a separate executable (DLL), implementing the device specific raw data collection logic. In one aspect of this embodiment, the data collection itself is implemented for each device separately, even if they "comply" to the generic algorithm described above.

For each supported storage disk array, a plugin is written which implements the discovery and provisioning functionalities. Plugins may use whatever mechanism of communication is available for that specific storage device, in order to retrieve data, and perform provisioning functions. To support a new device, associated functionality in the plugin is implemented, and the plugin wrapper is configured to know about this plugin. Such change does not require changes in the upper layer applications (consumer applications). Some examples of plugins are: HiCommand for Hitachi; SymAPI for EMC Symmetrix; Microsoft VDS on a Windows Server machine which could support any device with a VDS interface such as HP EVA, Xiotech, EMC Clariion; and CIM/SMIS/Blufin for IBM Shark and LSILogic.

Plugin mechanism enables dynamically loading of new plugins without requiring code changes in the rest of the application. Once a new plugin is completed according to specifications, that plugin is made available on the machine, and the configuration file of the Plugin Wrapper modified to know about this new plugin.

Each plugin may be using a different mechanism to communicate with the specific storage device. Some plugins may be used for multiple storage devices if those devices support the same interface.

IBM Shark Plugin uses SMI-S as the model and mechanism for data retrieval and storage provisioning functionalities. According to SMI-S a CIM Provider (server) manages the storage devices, and provides data retrieval and provisioning functionality for that device. All communications between the CIM Provider and CIM Client are encoded in XML and transferred over HTTP or HTTPS. IBM Shark Plugin is a CIM client that connects to IBM CIM providers to retrieve data and perform management operations.

Open source Pegasus libraries are used for the low level CIM functionality. CA_CIMTool.dll contains the functionality that encapsulates the required functionality of the Pegasus libraries in a single class called CA_CIMConnector. The CIM based plugins such as IBM Shark and LSILogic plugins uses customized versions of the CA_CIMConnector by extending this class.

LSILogic Plugin is designed the same way as the IBM Shark plugin. The difference between LSILogic Plugin and IBM Shark Plugin is the way retrieval functions and management functions are implemented. Although both IBM CIM Provider and LSILogic CIM Provider follow SMI-S, but each provider interprets the specification in its own way and uses different aspects of the specification. These differences are masked for the upper layer applications.

Plugin for Hitachi Disk Arrays uses HiCommand XML Interface that is a Hitachi specific API. HiCommand Server manages Hitachi storage devices and provides discovery and management functionality to client applications via HiCommand XML interface.

EMC Symmetrix plugin uses a vendor specific API called SymAPI. In addition to the API, a command line interface (SymCLI) is also used to implement some of the functionalities that are not available through the API.

SCSI API is used for the EMC Clariion plugin.

Virtual Disk Service (VDS) is a new service that is part of Microsoft Windows Server 2003. VDS enables multi-vendor storage devices to interoperate in Windows. VDS has application programming interfaces (APIs) to storage hardware and to management programs that manage the storage hardware. For the storage devices that has VDS support such as HP EVA, Xiotech and EMC Clariion, communication is performed via VDS with the Windows Server managing those devices, to discover and manage devices that use VDS APIs.

The Plugin wrapper, in one embodiment, is designed to handle the plugin loading and selection, thus abstracting to the upper level application the specificity of the different libraries. This library exports the same set of functions as the plugins. For example, when the user makes a function call it selects the right library, loads it if necessary, and then calls the matching function in the plugin. A handler containing the information to select the right library is added to each function's set of parameters.

Figure 1:
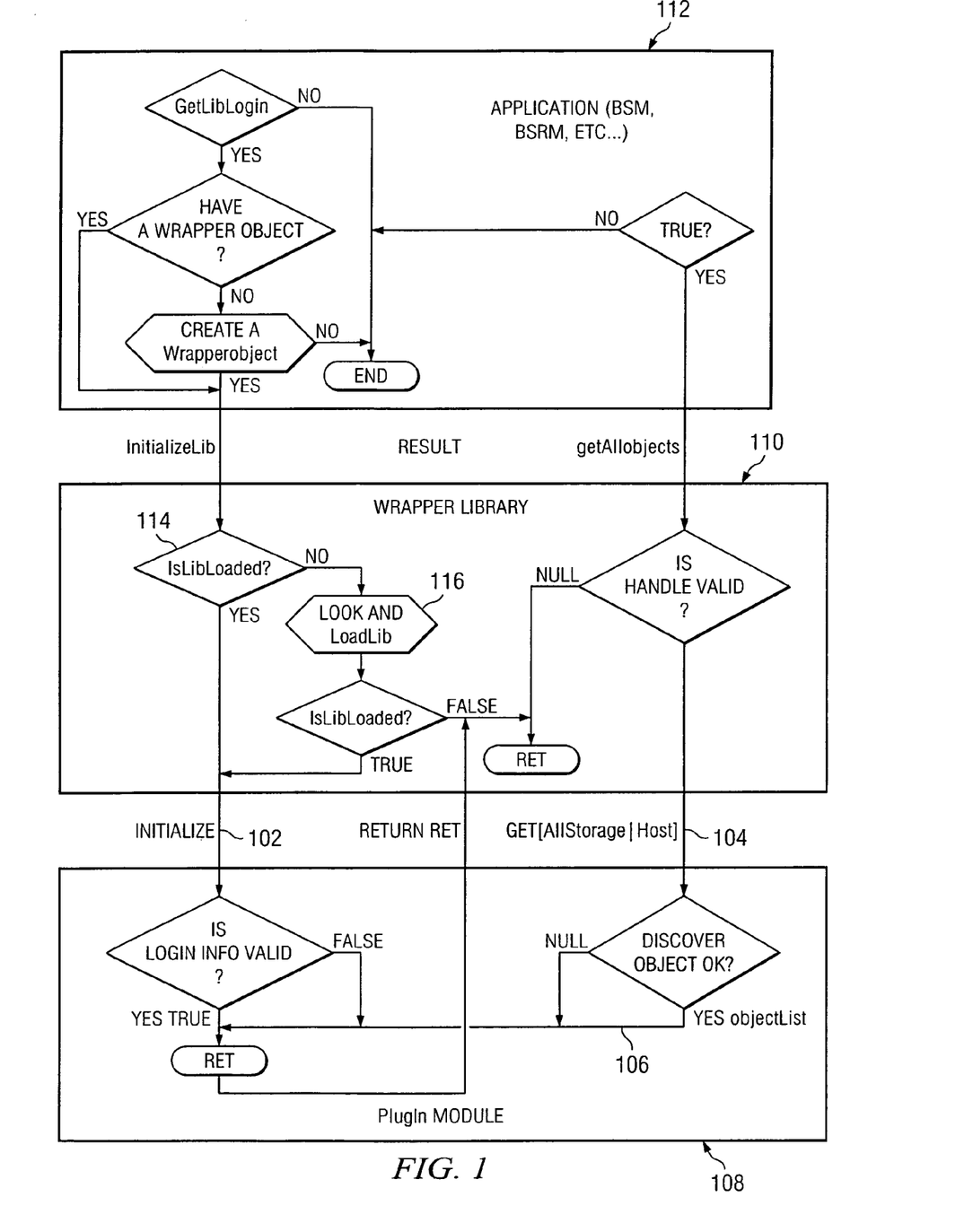
FIG. 1 is a flow diagram illustrating the method of the present disclosure in one embodiment.

FIG. 1 is a flow diagram illustrating the method of the present disclosure in one embodiment. At 102, the plugins are initialized, for example, by calling the Initialize function. If that function is successful it returns a handler, which will be used for any future call. At 104, all the devices (storage of host) are queried. At 106, the list of returned device is navigated to access the pertaining information.

The different functions may include: InitialiseStoragePlugIn, InitialiseHost, GetAllStorageArrays, GetAllHosts, releaseLibrary. For each object returned the application can call any available method. After calling the releaseLibrary the application calls again the Initialize* if it wants to query the object list again. It can call as many Get* function as it wants after the first Initialize*. How the information is refreshed is a decision of the plugin 108 implementer.

In one embodiment, the plugin wrapper 110 is used to provide a single library interface for all the plugins 108. A new library can be added, for instance, without changing the upper level application 112. The plugin exports a set of functions. In this case, the exported functions are RegisterLibrary and UnRegister library.

In one embodiment, the wrapper 110 is implemented by using a configurable list of plugins 108 where the name of the library to load is specified for each vendor/device. It may also use a plain text file having an entry for the library name for each vendor/device. Entry in the file may be: "Vendor ID [product ID] libraryName."

In one embodiment, an upper level application 112 call may be handled in three different phases. The library name matching that inquiry string is examined. If there is an exact match (for example, in string length), then the method proceeds to phase number two. Otherwise, the inquiry string is added into the inquiry list for that library before going to phase number two. If there is no library matching that inquiry string then error code is returned.

In phase two at 114, check is made to determine if the library is loaded. If it is then the method proceeds to the third phase. Otherwise, an attempt is made to load the library at 116. If it loads, then the method proceeds to the third phase. Otherwise the call is failed. At this point, a call to the corresponding methods in the plugin is made, and the plugin's return object is returned to the caller.

In one embodiment, this library exports three different methods. HANDLE InitialiseStoragePlugIn (String deviceInquiry string, String ipAddress, String userId, String password, String namespace) for a storage device; HANDLE InitializeHost (String hostIp, string userId, String password) for a host.

ObjectList GetAllStorageArrays (HANDLE handle);

CAhost GetAllHosts(HANDLE handle);

Before terminating, the application calls the releaseLibrary (HANDLE h) function.

The HANDLE is an opaque data structure. It returns an integer, which is the index of the library in the list of library.

The system and method of the present disclosure may be implemented and run on a general-purpose computer. The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A system for common storage object model, comprising:
   a computer-readable medium; and
   a program of instructions encoded on the computer-readable medium, the program of instructions comprising:
   a plurality of classes representing each of a respective one of a plurality of storage devices, each of the plurality of classes having at least one attribute that is specific to a particular vendor device platform associated with a specific storage device;
   a plurality of plugin modules operable to discover and provision at least one of the plurality of storage devices connected to a storage network using the plurality of classes, each of the plurality of plugin modules operable to retrieve data from at least one of the plurality of storage devices to populate an object model for a respective one of the plurality of storage devices; and
   a wrapper module comprising an upper level application that provides a single interface for the plurality of plug in modules, the wrapper module operable to:
      determine that the object model does not include a wrapper object for a specific one of the plurality of storage devices in response to receiving a user call identifying the specific one of the plurality of storage devices;
      create a wrapper object in the object model for the specific one of the plurality of storage devices that is not included in the object model; and
      select and load the specific one of the plurality of plugin modules in response to the user call identifying the specific one of the plurality of storage devices associated with the wrapper object and the specific one of the plurality of plugin modules.

2. The system of claim 1, wherein the plurality of classes representing respective plurality of storage devices are vendor independent data representation.

3. The system of claim 1, wherein the one or more classes may be modified based on changing storage environment.

4. The system of claim 1, wherein the one or more classes represent physical and logical storage entity.

5. The system of claim 1, wherein one or more relationships among storage entities are represented as attributes.

6. The system of claim 1, where one or more relationships among storage entities are represented as references.

7. The system of claim 1, wherein the one or more classes all have a common ancestor class.

8. The system of claim 7, wherein the common ancestor class provides clone, equal, and get extra property methods.

9. The system of claim 8, wherein the get extra property is method is operable to handle device specific properties.

10. The system of claim 1, wherein the one or more classes include objects that represent at least one of enclosure, fan, power supply, spindle, raid group, logical device, port, physical volume, physical partition, and network address.

11. A program storage device readable by machine, tangibly embodying a program of instructions executable by the machine to perform a method for common storage object model, comprising:
providing a plurality of classes to represent each of a respective one of a plurality of storage devices, each of the plurality of classes having at least one attribute that is specific to a particular vendor device platform associated with a specific storage device;
providing a plurality of plugin modules operable to discover and provision at least one of the plurality of storage devices connected to a storage network using the plurality of classes, each of the plurality of plugin modules operable to retrieve data from at least one of the plurality of storage devices to populate an object model for a respective one of the plurality of storage devices; and
providing a wrapper module comprising an upper level application that provides a single interface for the plurality of plug in modules;
using the wrapper module to determine that the object model does not include a wrapper object for a specific one of the plurality of storage devices in response to receiving a user call identifying the specific one of the plurality of storage devices;
using the wrapper module to create a wrapper object in the object model for the specific one of the plurality of storage devices that is not included in the object model; and
using the wrapper module select and load the specific one of the plurality of plugin modules in response to the user call identifying the specific one of the plurality of storage devices associated with the wrapper object and the specific one of the plurality of plugin modules.

12. The program storage device of claim 11, wherein the one or more classes representing respective one or more storage devices are vendor independent data representation.

13. The program storage device of claim 11, wherein the one or more classes may be modified based on changing storage environment.

14. The program storage device of claim 11, wherein the one or more classes represent physical and logical storage entity.

15. The program storage device of claim 11, wherein one or more relationships among storage entities are represented as attributes.

16. The program storage device of claim 11, where one or more relationships among storage entities are represented as references.

17. The program storage device of claim 11, wherein the one or more classes all have a common ancestor class.

18. The program storage device of claim 17, wherein the common ancestor class provides clone, equal, and get extra property methods.

19. The program storage device of claim 18, wherein the get extra property is method is operable to handle device specific properties.

20. The program storage device of claim 11, wherein the one or more classes include objects that represent at least one of enclosure, fan, power supply, spindle, raid group, logical device, port, physical volume, physical partition, and network address.

21. A method for common storage object model, comprising:
providing a plurality of classes to represent each of a respective one of a plurality of storage devices, each of the plurality of classes having at least one attribute that is specific to a particular vendor device platform associated with a specific storage device;
providing a plurality of plugin modules operable to discover and provision at least one of the plurality of storage devices connected to a storage network using the plurality of classes, each of the plurality of plugin modules operable to retrieve data from at least one of the plurality of storage devices to populate an object model for a respective one of the plurality of storage devices; and
providing a wrapper module comprising an upper level application that provides a single interface for the plurality of plug in modules;
using the wrapper module to determine that the object model does not include a wrapper object for a specific one of the plurality of storage devices in response to receiving a user call identifying the specific one of the plurality of storage devices;
using the wrapper module to create a wrapper object in the object model for the specific one of the plurality of storage devices that is not included in the object model; and
using the wrapper module select and load the specific one of the plurality of plugin modules in response to the user call identifying the specific one of the plurality of storage devices associated with the wrapper object and the specific one of the plurality of plugin modules.

22. The method of claim 21, wherein the one or more classes representing respective one or more storage devices are vendor independent data representation.

23. The method of claim 21, wherein the one or more classes may be modified based on changing storage environment.

24. The method of claim 21, wherein the one or more classes represent physical and logical storage entity.

25. The method of claim 21, wherein one or more relationships among storage entities are represented as attributes.

26. The method of claim 21, where one or more relationships among storage entities are represented as references.

27. The method of claim 21, wherein the one or more classes all have a common ancestor class.

28. The method of claim 27, wherein the common ancestor class provides clone, equal, and get extra property methods.

29. The method of claim 28, wherein the get extra property is method is operable to handle device specific properties.

30. The method of claim 21, wherein the one or more classes include objects that represent at least one of enclosure, fan, power supply, spindle, raid group, logical device, port, physical volume, physical partition, and network address.

* * * * *